Patented Dec. 12, 1950

2,533,207

UNITED STATES PATENT OFFICE 2,533,207

COPOLYMERS CONTAINING 9-METHYLENEFLUORENE

Joseph B. Dickey and Harry W. Coover, Jr., Rochester, N. Y., assignors to Eastman Kodak Company, Rochester, N. Y., a corporation of New Jersey No Drawing. Application October 2, 1947, Serial No. 777,580

12 Claims. (Cl. 260—63)

This invention relates to polymers and copolymers of 9-methylenefluorene. More specifically, this invention relates to a process for preparing copolymers of 9-methylenefluorene and polymerizable, unsaturated, organic compounds.

Reindel and Ferrer ("Berichte," volume 55 (1922), page 3313) described a process for preparing monomeric 9-methylenefluorene, and also described the preparation of a trimer of this monomer, ascribing the formula:

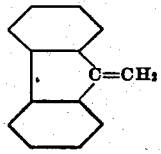

to the monomer, and the formula:

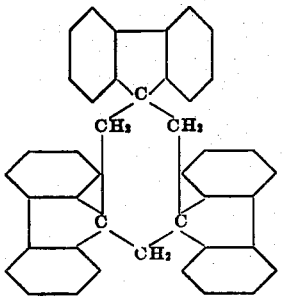

to the trimer.

We have now found that valuable copolymers of 9-methylenefluorene and polymerizable, unsaturated, organic compounds may be prepared by copolymerizing 9-methylenefluorene with one or more unsaturated, polymerizable, organic compounds.

It is, therefore, an object of this invention to provide new synthetic copolymers of 9-methylenefluorene and polymerizable, unsaturated, organic compounds.

A further object of this invention is to provide a process for preparing new synthetic copolymers which comprises copolymerizing a mixture of 9-methylenefluorene and one or more polymerizable, unsaturated, organic compounds. Other objects will become apparent from the consideration of the following description.

According to our process, we prepare new, resinous, copolymers by heating a mixture comprising 9-methylenefluorene and one or more polymerizable, unsaturated, organic compounds.

Substantially, any organic compound containing unsaturation of the olefinic type may be used to prepare the copolymers of this invention. Since 9-methylenefluorene is a hydrocarbon and contains only the olefinic functional group, it is not prone to undergo undesirable side reactions which might otherwise occur with other types of unsaturated compounds. Advantageously, we may use such compounds as acrylates, methacrylates, fumarates, maleates, acrylonitriles, α-substituted acrylonitriles, acryl amides, vinyl sulfones, vinyl sulfonamides, alkenyl ketones, vinyl halides, or hydrocarbons containing olefinic unsaturation.

The acrylates or methacrylates we may advantageously use in our process may be represented by the formula:

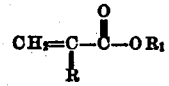

where R represents a member selected from the group consisting of hydrogen, methyl, or an acyloxy group, such as acetoxy, propionyloxy, butyryloxy, isobutyryloxy (i. e., an acyl group of an aliphatic carboxylic acid having 2 to 4 carbon atoms), and $R_1$ represents a member selected from the group consisting of hydrogen, an alkyl group, such as methyl, ethyl, propyl, isopropyl, butyl, isobutyl, secondary and tertiary butyl (i. e. an alkyl radical represented by the formula $C_nH_{2n+1}$ wherein $n$ is a positive integer from 1 to 4), an arylalkyl group such as benzyl, β-phenyl ethyl, etc., or an alkenyl group, such as vinyl, allyl, methallyl, crotyl, isopropenyl (i. e. an alkenyl group represented by the formula $C_nH_{2n-1}$ where $n$ is a positive integer from 2 to 4). Typical are methyl acrylate, methyl methacrylate, ethyl acrylate, ethyl methacrylate, propyl acrylate, propyl α-methylacrylate, butyl acrylate, butyl methacrylate, benzyl acrylate, benzyl methacrylate, vinyl acrylate, vinyl methacrylate, allyl acrylate, allyl methacrylate, methallyl acrylate, methallyl methacrylate, methyl-α-acetoxyacrylate, ethyl α-acetoxy acrylate, butyl α-butyryloxy acrylate, benzyl α-butyryloxy acrylate, etc.

The olefinic nitriles with which 9-methylenefluorene may be copolymerized may advantageously be represented by the formula:

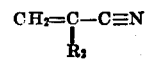

where $R_2$ represents a member selected from the group consisting of a hydrogen atom, a methyl group ($CH_3$), or an acyloxy radical, such acetoxy, propionyloxy, butyryloxy, isobutyryloxy (i. e., an acyl group of an aliphatic carboxylic acid having 2 to 4 carbon atoms). Typical are acrylonitrile, α-methyl acrylonitrile, α-acetoxy-acrylonitrile, α-butyryloxy acrylonitrile, α-isobutyryloxy acrylonitrile, etc.

The olefinic ketones which we may advantageously use in our process may be represented by the formula:

wherein $R_3$ represents a member selected from the group consisting of an alkyl group, such as methyl, ethyl, propyl, isopropyl, n-butyl, etc. (i. e., an alkyl group having the formula $C_nH_{2n+1}$ where $n$ is a positive integer from 1 to 4), or an alkenyl group such as vinyl, allyl, methallyl, isopropenyl, or crotyl, (i. e., an alkenyl group having the formula $C_nH_{2n-1}$ where $n$ is a positive integer from 2 to 4), and $R_4$ is an alkenyl group such as vinyl, allyl, methallyl, crotyl, or isopropenyl (i. e., an alkenyl group having the formula $C_nH_{2n-1}$ wherein $n$ is a positive integer from 2 to 4). Typical are methyl isopropenyl ketone, methyl vinyl ketone, ethyl vinyl ketone, butyl vinyl ketone, ethyl isopropenyl ketone, divinyl ketone, diisopropenyl ketone, diallyl ketone, dimethallyl ketone, etc.

The olefinic acrylamides which we may use may be represented by the formula:

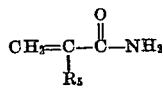

wherein $R_5$ represents a member selected from the group consisting of hydrogen, a methyl group, or an acyloxy group, such as acetoxy, propionyloxy, butyryloxy, isobutyryloxy (i. e. an acyl group of an aliphatic carboxylic acid having 2 to 4 carbon atoms.) Typical are acrylamide, α-methacrylamide, α-acetoxyacrylamide, α-propionyloxyacrylamide, α-isobutyryloxy acrylamide, etc.

The maleates or fumarates which we may advantageously use may be represented from the formula:

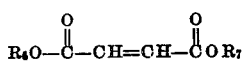

wherein $R_6$ and $R_7$ each represents a member selected from the group consisting of hydrogen, an alkyl group such as methyl, ethyl, propyl, isopropyl, butyl, isobutyl, secondary or tertiary butyl (i. e. an alkyl group having the formula $C_nH_{2n+1}$ wherein $n$ is a positive integer from 1 to 4) an aralkyl group such as benzyl, β-phenyl ethyl, etc., or an alkenyl group, such as vinyl, allyl, methallyl, or crotyl (i. e. an alkenyl group having the formula $C_nH_{2n-1}$ wherein $n$ is a positive integer from 2 to 4). Typical are monomethyl maleate, monomethyl fumarate, dimethyl maleate, dimethyl fumarate, diethyl maleate, diethyl fumarate, dipropyl maleate, dipropyl fumarate, dibutyl maleate, dibutyl fumarate, diisopropyl maleate, diisopropyl fumarate, diisobutyl maleate, diisobutyl fumarate, dibenzyl maleate, dibenzyl fumarate, divinyl maleate, diallyl maleate, diallyl fumarate, dimethallyl maleate, dimethallyl fumarate, dicrotyl maleate, dicrotyl fumarate, etc.

The olefinic carboxylic acid esters which we may use may be represented by the formula:

wherein $R_8$ represents a member selected from the group consisting of hydrogen, an alkyl group such as methyl, ethyl, propyl, isopropyl (i. e. an alkyl group having the formula $C_nH_{2n+1}$ where $n$ is a positive integer from 1 to 3), an aryl group such as phenyl o-, m-, and p-methylphenyl (i. e. a mononuclear aryl group of the benzene series having 6 to 10 carbon atoms), or substituted aryl group such as chlorophenyl, carbovinyloxy phenyl

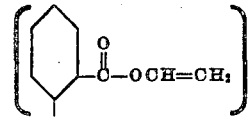

etc. Typical are vinyl formate, vinyl acetate, vinyl propionate, vinyl butyrate, vinyl isobutyrate, vinyl benzoate, vinyl chlorobenzoate and divinyl phthalate, etc.

The olefinic hydrocarbons with which we may copolymerize 9-methylenefluorene may be represented by the formula:

$$R_9CH=CH_2$$

where $R_9$ represents a member selected from the group consisting of hydrogen, an aryl group such as phenyl, chlorophenyl, p-acetaminophenyl, an ethenyl group ($CH_2=CH-$) or substituted ethenyl group. Typical are ethylene, styrene, o-, m- and p-chlorostyrene, p-acetamino styrene, 1,3-butadiene, 2,3-dimethyl-1,3-butadiene, chloroprene, piperylene, etc.

The olefinic or vinyl sulfonamides which may advantageously be used in our process may be represented by the formula:

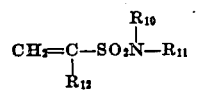

wherein $R_{10}$ and $R_{11}$ each represents a hydrogen atom, or an alkyl group such as methyl, ethyl, propyl, butyl (i. e. an alkyl group having the formula $C_nH_{2n+1}$ where $n$ is a positive integer from 1 to 4), and $R_{12}$ represents a member selected from the group consisting of hydrogen, a methyl group, or an ethyl group. Typical are vinyl sulfone amide, N-methyl vinyl sulfone amide, N-butyl-α-methyl vinyl sulfone amide, etc.

The vinyl halides which we may advantageously use may be represented by the formula:

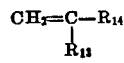

where $R_{13}$ represents a halogen atom such as chlorine, bromine, iodine, or fluorine, and $R_{14}$ represents a member selected from the group consisting of a hydrogen atom, a methyl ($CH_3-$) group, or a halogen atom such as chlorine, bromine, iodine, or fluorine. Typical are vinyl chloride, vinyl bromide, vinyl iodide, vinyl fluoride, isopropenyl chloride, isopropenyl bromide, vinylidene chloride, vinylidene bromide, etc.

Other unsaturated organic compounds can likewise be used to advantage in the process described below. Other olefinic compounds containing functional groups such as Cl, CN, $NO_2$, Br, F, etc. may be used without difficulty.

In accordance with our invention, we copolymerize 9-methylenefluorene with one or more of the polymerizable unsaturated organic compounds listed above. The copolymerization is accelerated by heat and can be further accelerated by use of well-known polymerization catalysts. Exemplary of such catalysts are the organic peroxides (e. g. benzoyl peroxide, acetyl peroxide, benzoyl acetyl peroxide, lauroyl peroxide, etc.), inorganic peroxides such as hydrogen peroxide, perborates (e. g. alkali metal perborates), and persulfates (e. g. alkali metal persulfates).

The temperature at which the copolymerization is effected can vary from ordinary room temperature to approximately 100° C. When volatile or vaporous unsaturated compounds are being used, it may be advantageous to use superatmospheric pressures in order to keep the reaction mixtures primarily in the liquid state. Ordinarily, we prefer to use a temperature of from 50 to 80° C. for optimum results. The copolymerization may be carried out by any of the common methods known to those skilled in the art. For example, by the bead or emulsion method, in which water or other medium in which the monomers are insoluble is employed as a dispersing medium, with or without emulsifying agents, such as the amines, etc. The copolymerization can also be effected in the presence of diluents such as benzene, toluene, dioxane, xylene, etc. which is advantageously a solvent for the copolymer.

Generally, any ratio of 9-methylenefluorene to the total organic, unsaturated compounds present in the reaction mixture may be used. When the reaction mixture consists of a tacky or semi-polymerized mixture the copolymer may be separated therefrom by addition of a solvent which dissolves the monomers but not the polymers (e. g. methyl or ethyl alcohols). When the emulsion method of copolymerization is used, these steps are unnecessary since the copolymer precipitates from the dispersing medium. Advantageously we can use from 2 to 95 mol-percent of 9-methylenefluorene and from 5 to 98 mol-percent of another unsaturated compound, although a more limited range, such as from 5 to 70 mol-percent of 9-methylenefluorene and from 30 to 95 mol-percent of another unsaturated compound, can be used. We can also use a ratio of 9-methylenefluorene to unsaturated compound of from 5:1 to 1:5 parts by weight.

The following examples will further serve to characterize my invention.

*Example 1.—Polymeric 9-methylenefluorene*

10 gms. of 9-methylenefluorene are dissolved in 100 cc. of benzene which contains no dissolved oxygen, and the solution is polymerized by heating at 60° C. by using 0.1 gm. of benzoyl peroxide as a catalyst. After heating for twenty hours, the reaction mixture is poured into alcohol, the residue filtered, washed with alcohol, and then dried. A resinous polymer is obtained which can be easily molded in the usual manner.

*Example 2.—Copolymer of methyl methacrylate and 9-methylenefluorene*

20 gms. of methyl methacrylate are added to 5 gms. of 9-methylenefluorene and the mixture is copolymerized by heating at 60° C. in an atmosphere of nitrogen while using 0.5% benzoyl peroxide as a catalyst. The product thus obtained was molded with ease. When methyl methacrylate is replaced by such compounds as butyl methacrylate, β-cyanoethyl acrylate, methyl acrylate, methyl-α-cyanoacrylate, etc. other resinous copolymers may be obtained.

*Example 3.—Copolymer of methyl-α-acetoxy-acrylate and 9-methylenefluorene*

25 gms. of 9-methylenefluorene are mixed intimately with 10 gms. of methyl-α-acetoxyacrylate, and the mixture polymerized by heating at 80° C. in the presence of 0.5% benzoyl peroxide as a catalyst. The product thus obtained had resinous properties and was suitable for molding. In lieu of the methyl-α-acetoxyacrylate other compounds such as ethyl-α-propionyloxy acrylate, etc. may be used.

*Example 4.—Copolymer of acrylonitrile and 9-methylenefluorene*

5 grams of 9-methylenefluorene and 25 gms. of acrylonitrile are mixed and then dissolved in a 1:1 mixture of acetic acid (75 cc.) and dimethyl formamide (dispersing agent), and the dispersion is polymerized by heat at 60° C. in the presence of benzoyl peroxide as a catalyst. The polymer precipitates as a fine, colorless powder. When the polymer is dissolved in dimethyl formamide, a solution is obtained which may be used in preparing fibers having good properties, the fibers being subsequently spun, if desired, through a suitable orifice into water. The resulting fiber is then drafted 200–500% in hot air or oil. Other copolymers may be prepared by substituting α-acetoxyacrylonitrile, α-trifluoroacetoxyacrylonitrile, α-butoxyacrylonitrile, α-cyanoethyl acrylate, α-methacrylonitrile, α-cyanoacrylonitrile, etc. for the acrylonitrile described above.

*Example 5.—Copolymer of methyl vinyl ketone and 9-methylenefluorene*

5 grams of 9-methylenefluorene and 10 grams of methyl vinyl ketone are emulsified with 50 cc. of water in the presence of 0.5 gm. of polyvinyl alcohol as the emulsifying agent, and ammonium persulfate as a catalyst. After heating at 60–70° C. for approximately 24 hours, acetic acid is added, and a white product is obtained. This product is then filtered from the aqueous medium and washed with alcohol and dried. The resulting product has resinous properties and is suitable for molding. In lieu of using methyl vinyl ketone, other ketones such as methyl isopropenyl ketone, methyl-α-methoxyvinyl ketone, methyl-α-ethoxyvinyl ketone, methyl-α-carbethoxyvinyl ketone, etc. may be used.

*Example 6.—Copolymer of acrylamide and 9-methylenefluorene*

10 gms. of 9-methylenefluorene and 5 gms. of acrylamide are intimately mixed and dissolved in a 1:1 mixture of acetic acid and dimethyl fumarate, and the solution polymerized as described in Example 4. Water is then added to the reaction product and a white product precipitates. This product is then filtered, washed with water and alcohol, and dried. The copolymer so obtained has resinous properties and is suitable for molding. In lieu of acrylamide other olefinic amides such as α-methylacrylamide, α-acetoxyacrylamide, α-carbomethoxyacrylamide, etc. may be used.

*Example 7.—Copolymer of dimethyl fumarate and 9-methylenefluorene*

10 gms. of 9-methylenefluorene and 25 gms. of dimethyl fumarate are intimately mixed and polymerized by heating at 70° C. for 48 hours in the presence of 0.2 gm. of benzoyl peroxide as polymerization catalyst. The product so obtained is then digested with methanol and dried. A white residue remained which can be molded with heat. When diethyl fumarate diisopropyl fumarate, dimethyl maleate, cis- and trans-β-cyanomethyl acrylate, cis- and trans-β-carboxyamidoacrylate, etc. are substituted for the dimethyl fumarate above, other copolymers suitable for molding are obtained.

*Example 8.—Copolymer of styrene and 9-methylenefluorene*

10 gms. of 9-methylenefluorene and 10 gms. of styrene are intimately mixed and heated en masse in an atmosphere of nitrogen at a temperature of 60° C. in the presence of benzoyl peroxide as a polymerization catalyst. The product so obtained has resinous properties and is suitable for molding. In lieu of using styrene, other olefinic hydrocarbons such as dichloro or difluoro styrene, α-carboxyamido styrene, p-acetaminostyrene, butadiene, chloropyrene, etc. may be used.

*Example 9.—Copolymer of vinyl sulfonamide, vinyl acetate, and 9-methylenefluorene*

10 gms. of 9-methylenefluorene, 10 gms. of vinyl sulfonamide, and 5 gms. of vinyl acetate are intimately mixed and polymerized en masse by heating as described in Example 8 above in the presence of benzoyl peroxide as a catalyst. A yellow, resinous solid which is suitable for molding results. In lieu of using vinylsulfonamide, other olefinic compounds of sulphur such as N-methylvinylsulfonamide, N-butyl-α-methylvinylsulfonamide, methylvinylsulfone, etc. may be used. In place of vinyl acetate other vinyl-type esters such as vinyl trifluoroacetate, vinyl benzoate, isopropenyl acetate, etc. may be used to advantage.

*Example 10.—Copolymer of ethylene and 9-methylenefluorene*

10 gms. of 9-methylenefluorene are placed in a silver-lined, steel autoclave and 40 gms. hexane and 0.2 gm. of benzoyl peroxide added. Ethylene, under a pressure of 600 atmospheres is pumped into the reactor containing the 9-methylenefluorene solution. The mixture is agitated and the temperature of the reactor raised to 125° C., heating is continued for 10 hours, and the reactor then cooled. The charge is removed from the reactor and the residue steam distilled and filtered. A resinous solid of tough texture is obtained which has valuable properties when molded. Other olefinic hydrocarbons such as propylene, piperylene, etc. may be used in lieu of ethylene.

*Example 11.—Copolymer of vinylidene chloride, ethylene and 9-methylenefluorene*

20 gms. of vinylidene chloride are placed in a silver-lined autoclave, and 0.07 gm. of benzoyl peroxide and 5 gms. of 9-methylenefluorene added. The autoclave is closed, and ethylene is pumped in until a pressure of 1,000 atmospheres is reached. The mixture is then heated at 70° C. for 20 hours. The reactor is cooled, the residue removed and washed with water. A tough solid suitable for molding results. In lieu of using vinylidene chloride, it is possible to use such compounds as vinyl chloride, isopropenyl chloride, isopropenyl bromide, vinyl bromide, vinyl fluoride, etc.

*Example 12.—Copolymer of acrylonitrile and 9-methylenefluorene*

10.6 g. (0.2 mol), 1.78 g. (0.01 mol) of 9-methylenefluorene, and 1.1 g. (0.1% by weight) of benzoyl peroxide are placed in a glass ampoule. The ampoule is then cooled to approximately −10° C. and the air removed by evacuating with a vacuum pump. The ampoule is then flushed with nitrogen 3–4 times to remove any supernatant oxygen, and the ampoule then sealed. The ampoule is then placed in a water bath and heated at 50–60° C. until the contents become solid. The slightly yellowish, hard, tough polymer is then dissolved in dimethyl formamide, and the solution poured into distilled water. The fine, almost white precipitate can be dissolved in dimethyl formamide, dimethyl acetamide, succinonitrile and spun into fibers.

*Example 13.—Copolymer of acrylonitrile, 9-methylenefluorene and itaconic acid*

10.6 g. of acrylonitrile (0.2 mol), 1.78 g. (0.01 mol) of 9-methylenefluorene, 0.65 g. (0.005 mol) of itaconic acid, and 1.3 g. (0.1% by weight) of benzoyl peroxide are placed in a sealed glass ampoule under an atmosphere of nitrogen as in Example 12. The ampoule is then placed in a water bath and heated at 50–60° C. until the contents become solid. The resulting yellowish solid is then dissolved in dimethyl formamide and precipitated by pouring into water.

By substituting molecularly equivalent amounts of citraconic, mesaconic, acrylic, or α-methacrylic acids in the above example, other copolymers can be prepared.

*Example 14.—Copolymer of methyl methacrylate and 9-methylenefluorene*

100 g. (1.0 mol) of methyl methacrylate, 8.9 g. (0.05 mol) of 9-methylenefluorene, and 1.5 g. of benzoyl peroxide are placed in a sealed glass ampoule under an atmosphere of nitrogen. The ampoule is then placed in a water bath and heated at 50–60° C. until the contents become solid. The resulting polymer is dissolved in dimethyl formamide and precipitated by pouring into methanol.

By substituting molecularly equivalent amounts of ethyl methacrylate, n-propyl methacrylate, or n-butyl methacrylate in the above example, other copolymers can be prepared.

*Example 15.—Copolymers of methyl methacrylate and 9-methylenefluorene*

59.3 g. (0.3 mol) of 9-methylenefluorene, 1.5 g. (0.015 mol) of methyl methacrylate, and 2.5 g. of benzoyl peroxide are placed in a sealed glass ampoule under an atmosphere of nitrogen as in Example 12. The ampoule is then placed in a water bath and heated at 50–60° C. until the contents of the ampoule become solid. The resulting hard polymer is dissolved in dimethyl formamide and precipitated by pouring into water.

By substituting molecularly equivalent amounts of n-butyl acrylate, ethyl methacrylate, or n-propyl methacrylate in the above example, other copolymers can be prepared.

A particular advantage in our use of 9-methylenefluorene in preparing copolymers is that even when used in small amounts (e. g. as low as 2 mol percent) it has a profound effect on the solubility of the resulting polymers. For example, polyacrylonitrile can be dissolved in dimethyl formamide, but not dimethyl acetamide, but when no more than 2 mol-percent of 9-methylenefluorene is copolymerized with acrylonitrile, the resulting polymer can be dissolved in dimethyl acetamide. Dimethyl acetamide is much preferred to dimethyl formamide, due to its lower cost and lower toxicity. The advantages of the use of 9-methylenefluorene become particularly apparent when it is desired to prepare films or fibers from the copolymers prepared in accordance with our invention.

Although we can advantageously use only one or two unsaturated compounds in addition to the 9-methylenefluorene in a single copolymerization, we can use a larger number without difficulty.

What we claim is:

1. A resinous copolymer of 5:1 parts by weight of 9-methylenefluorene and 1:5 parts by weight of methyl methacrylate.

2. A resinous copolymer of 5:1 parts by weight of 9-methylenefluorene and 1:5 parts by weight of methyl-α-acetoxyacrylate.

3. A resinous copolymer of 5:1 parts by weight of 9-methylenefluorene and 1:5 parts by weight of dimethyl fumarate.

4. A resinous copolymer of 9-methylenefluorene and a polymerizable, unsaturated compound selected from the group consisting of: (a) esters having the formula:

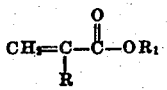

wherein R represents a member selected from the group consisting of hydrogen, a methyl group, and an acyloxy group of an aliphatic carboxylic acid having 2 to 4 carbon atoms, and $R_1$ represents a member selected from the group consisting of an alkyl group having 1 to 4 carbon atoms, an alkenyl group having 2 to 4 carbon atoms, and an aralkyl group; (b) nitriles having the formula:

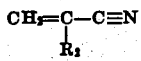

wherein $R_2$ represents a member selected from the group consisting of a hydrogen atom, a methyl group, and an acyloxy group of an aliphatic carboxylic acid having 2 to 4 carbon atoms, and (c) diesters having the formula:

wherein $R_3$ and $R_4$ each represents a member selected from the group consisting of an alkyl group having 1 to 4 carbon atoms and an aralkyl group, said copolymer having been prepared from a mixture consisting of 2 to 95 mol-percent of 9-methylenefluorene and 5 to 98 mol-percent of the polymerizable unsaturated compound.

5. A process for preparing a resinous copolymer which comprises polymerizing in the presence of a peroxide polymerization catalyst a mixture consisting of 2 to 95 mol-percent of 9-methylenefluorene and 5 to 98 mol-percent of a polymerizable, unsaturated compound selected from the group consisting of: (a) esters having the formula:

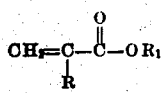

wherein R represents a member selected from the group consisting of hydrogen, a methyl group, and an acyloxy group of an aliphatic carboxylic acid having 2 to 4 carbon atoms, and $R_1$ represents a member selected from the group consisting of an alkyl group having 1 to 4 carbon atoms, an alkenyl group having 2 to 4 carbon atoms, and an aralkyl group; (b) nitriles having the formula:

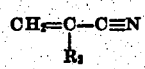

wherein $R_2$ represents a member selected from the group consisting of a hydrogen atom, a methyl group, and an acyloxy group of an aliphatic carboxylic acid having 2 to 4 carbon atoms, and (c) diesters having the formula:

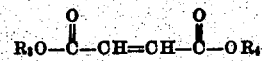

wherein $R_3$ and $R_4$ each represents a member selected from the group consisting of an alkyl group having 1 to 4 carbon atoms and an aralkyl group.

6. A resinous copolymer of 5:1 parts by weight of 9-methylenefluorene and 1:5 parts by weight of an ester represented by the formula:

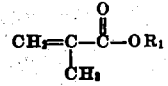

wherein $R_1$ represents an alkyl group having 1 to 4 carbon atoms.

7. A resinous copolymer of 5:1 parts by weight of 9-methylenefluorene and 1:5 parts by weight of a compound selected from those represented by the formula:

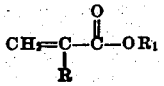

wherein R represents an acyloxy group of an aliphatic carboxylic acid having 2 to 4 carbon atoms and $R_1$ represents an alkyl group of the formula $C_nH_{2n+1}$ wherein n is a positive integer from 1 to 4.

8. A resinous copolymer of 5:1 parts by weight of 9-methylenefluorene and 1:5 parts by weight of a compound selected from those represented by the formula:

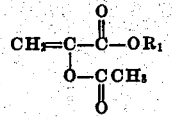

wherein $R_1$ represents an alkyl group of the formula $C_nH_{2n+1}$ wherein $n$ is a positive integer from 1 to 4.

9. A resinous copolymer of 5:1 parts by weight of 9-methylenefluorene and 1:5 parts by weight of an ester represented by the formula:

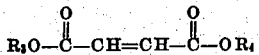

wherein $R_3$ and $R_4$ each represents an alkyl group of the formula $C_nH_{2n+1}$ wherein $n$ is a positive integer from 1 to 4.

10. A process for preparing resinous copolymers which comprises polymerizing in the presence of a peroxide polymerization catalyst a mixture consisting of 5:1 parts by weight of 9-methylenefluorene and 1:5 parts by weight of an ester represented by the formula:

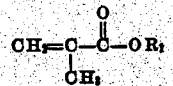

wherein $R_1$ represents an alkyl group having 1 to 4 carbon atoms.

11. A process for preparing resinous copolymers which comprises polymerizing in the presence of a peroxide polymerization catalyst a mixture consisting of 5:1 parts by weight of 9-methylenefluorene and 1:5 parts by weight of a compound selected from those represented by the formula:

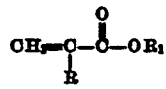

wherein R represents an acyloxy group of an aliphatic carboxylic acid having 2 to 4 carbon atoms and $R_1$ represents an alkyl group of the formula $C_nH_{2n+1}$ wherein $n$ is a positive integer from 1 to 4.

12. A process for preparing a resinous copolymer which comprises polymerizing in the presence of a peroxide polymerization catalyst a mixture consisting of 5:1 parts by weight of 9-methylenefluorene and 1:5 parts by weight of an ester represented by the formula:

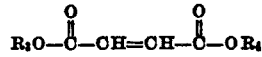

wherein $R_3$ and $R_4$ each represents an alkyl group of the formula $C_nH_{2n+1}$ wherein $n$ is a positive integer from 1 to 4.

JOSEPH B. DICKEY.
HARRY W. COOVER, Jr.

REFERENCES CITED

The following references are of record in the file of this patent:

Sieglitz et al.: Ber. 55B, 2032–40 (1922); abst. in Chem. Abst., 17, 386–87 (1923).
Ferrer: Anales soc. espan. fis. quim. 20, 459–66 (1922), abst. in Chem. Abst., 17, 3177 (1923).
Wieland et al.: Ber. 55B, 3313–7 (1922); abst. in Chem. Abst., 17, 754 (1923).
Wieland et al.: Ann. 530, 274–90 (1937); abst. in Chem. Abst., 32, 137 (1938).